United States Patent [19]
Malpass, Jr.

[11] Patent Number: 5,262,372
[45] Date of Patent: Nov. 16, 1993

[54] SUPPORTED VANADIUM CATALYST FOR PRODUTION OF POLYOLEFINS OF CONTROLLED MOLECULAR WEIGHT DISTRIBUTION

[75] Inventor: Gerald D. Malpass, Jr., Kingwood, Tex.

[73] Assignee: Exxon Chemical Patents Inc., Linden, N.J.

[21] Appl. No.: 830,794

[22] Filed: Feb. 3, 1992

Related U.S. Application Data

[63] Continuation of Ser. No. 708,128, May 29, 1991, abandoned, which is a continuation of Ser. No. 280,630, Dec. 6, 1988, abandoned.

[51] Int. Cl.$^5$ .............................. C08F 4/68
[52] U.S. Cl. .................... 502/109; 502/104; 502/107; 502/119; 502/120; 502/121; 526/139
[58] Field of Search ............... 502/104, 107, 109, 119, 502/120, 121

[56] References Cited

U.S. PATENT DOCUMENTS

| | | | |
|---|---|---|---|
| 3,278,643 | 10/1966 | Achon | 502/121 X |
| 3,758,621 | 9/1973 | Morikawa et al. | 502/121 X |
| 4,233,182 | 11/1980 | Hoff et al. | 502/113 |
| 4,302,565 | 11/1981 | Goeke et al. | 526/88 |
| 4,302,566 | 11/1981 | Karol et al. | 526/125 |
| 4,477,586 | 10/1984 | McDaniel | 502/104 |
| 4,507,449 | 3/1985 | Martin | 252/429 B X |
| 4,514,514 | 4/1985 | Martin | 502/121 |
| 4,886,771 | 12/1989 | Kao et al. | 502/121 |

FOREIGN PATENT DOCUMENTS 8615  3/1972  Japan ................................. 502/121

*Primary Examiner*—Patrick P. Garvin
*Attorney, Agent, or Firm*—T. Dean Simmons; Douglas W. Miller

[57] ABSTRACT

A process for the production of a highly active olefin polymerization vanadium catalyst, comprising a vanadium compound and an organophosphorous compound combined on a catalyst support, which is capable of producing a broad range of polymer products. The polymer product's molecular weight distribution may be tailored to suit a desired application by controlling the P/V ratio of the catalyst.

19 Claims, No Drawings

SUPPORTED VANADIUM CATALYST FOR PRODUTION OF POLYOLEFINS OF CONTROLLED MOLECULAR WEIGHT DISTRIBUTION

This is a continuation of application Ser. No. 708,128, filed May 29, 1991, which is a continuation of application Ser. No. 280,630, filed Dec. 6, 1988, both now abandoned.

BACKGROUND OF THE INVENTION

1. Field of the Invention

This invention relates to a process for preparing a novel supported vanadium catalyst which may be employed with a cocatalyst for use in the polymerization of olefins to polyolefins. The process comprises reacting a supported vanadium catalyst composition with a phosphine compound, in variable amounts, to produce a novel supported vanadium catalyst which catalyzes the polymerization of olefin monomers to produce a polyolefin the molecular weight distribution of which is controlled as a function of the P/V mole ratio of the catalyst.

2. Background Information

The use of vanadium-based catalysts in the polymerization of olefins is well known.

When produced without a support, vanadium catalysts usually assume the form of an oil or gum. As a consequence, unsupported vanadium-based catalysts are unsuitable for use in a slurry or gas phase reaction procedure by which a polymer product may be produced directly in particle form. Unsupported vanadium-based catalysts are not suited for slurry or gas phase polymerization procedures because the oil or gum form of the unsupported catalyst causes reactor fouling.

U.S. Pat. No. 3,278,643 of Achon teaches the copolymerization of ethylene with 1-olefins using a catalyst which consists of a vanadium oxytrichloride, an alkylaluminum dihalide, and an organic phosphorous compound. The patent does not teach how to obtain the catalyst in a particulate form so as to permit use of the catalyst in a gas or slurry phase polymerization process and does not teach any method to produce a wide range of molecular weight distribution.

U.S. Pat. 4,233,182 teaches the polymerization of olefins with a catalyst formed from a transition metal compound, an organometallic promoter, an oxygenated phosphorous compound, a divalent metal halide, and an aluminum compound. This patent does not, however, teach how to control the molecular weight distribution (MWD) of the resin produced.

To overcome the reactor fouling problem U. S. Pat. No. 4,514,514 by Martin, teaches a process for polymerizing ethylene in the presence of a solid, unsupported catalyst consisting of a vanadium compound, a phosphorous compound, and an organoaluminum compound. The catalyst is highly active and offers some control over the phosphorous compound. Martin's process produces the catalyst precursor as an "oily mass" in certain halogenated hydrocarbon solvents which is thereafter precipitated to a solid catalyst composition by addition of ethylaluminum dichloride (EADC). The use of a halogenated hydrocarbon solvent as the medium in which to react a vanadium compound with an organo-phosphorous compound to produce a product which may be precipitated in solid form by an EADC addition step is a critical aspect of Martin's invention.

U.S. Pat. No. 4,507,449, also by Martin, teaches a polymerization process for the formation of polyethylene using an unsupported solid form of catalyst consisting of a vanadium compound, a phosphorous compound, and a metal halide. The metal halide is a necessary component of the invention in order to form the catalyst in solid particulate form.

It is worth noting that in order to obtain a solid catalyst which may be used in gas or slurry phase reactors, the Martin catalysts require the use of a halogenation agent or a metal halide. This is not desirable since it increases the level of residual halogen in the polymer product which correspondingly leads to increased corrosivity of the polymer product. This problem may, of course, be solved by a deashing step in which catalyst residue is separated from the product. However, a catalyst deashing step increases to cost of producing the polymer product.

An alternative process which provides a solution to both the reactor fouling and the halogen corrosivity problems, is to place a vanadium catalyst composition on a support material. In supported form the vanadium catalyst can be used in a gas or slurry phase processes without encountering reactor fouling. However, it is well known in the art that supported forms of vanadium catalysts present problems of their own. The most significant of these problems is the inability to closely control the MWD of the polymer produced. Generally, supported vanadium catalysts produce a polymer having a broad MWD, the polymer product therefore will include a significant amount of low molecular weight oligomers. These oligomers, when present in polymers used in the manufacture of blow molded articles, produce an unacceptable amount of smoke.

It would be desirable to have a supported vanadium catalyst which could be used in a gas or slurry phase polymerization process to produce in combination with a diene a polyolefin resin of narrower MWD for use as a blow molding resin as described, in co-pending U.S. application Ser. No. 07/981,208.

Yet other applications, such as the manufacture of high density polyethylene (HDPE) films, a high molecular weight resin having a broader MWD is desired. For other resin applications, such as injection molding or linear low density polyethylene (LLDPE) film production, a resin having a narrower MWD is desired. In yet other applications such as wire and cable coatings manufacture, it is desirable for the resin to have a MWD of intermediate breadth.

It would be desirable to have a supported vanadium catalyst for gas or slurry phase production of high molecular weight polyolefins having a MWD which is controllable between broad to narrow, as desired depending on the intended end use of the resin product. A clear need exists in industry for a supported vanadium catalyst which can be tailored to provide resins of a specific MWD over a wide molecular weight range, which will be substantially non-fouling in use, and which will provide a non-corrosive polymer without requiring a deashing step.

SUMMARY OF THE INVENTION

This invention discloses a novel method for producing a vanadium-based supported catalyst which, when employed in conjunction with a cocatalyst, provides a catalyst system having unique properties for olefin polymerization, including high catalytic activity, increased polyolefin yield, reduced reactor fouling, the ability to produce high molecular weight polyolefins and the ability to control the MWD of the polyolefin over a wide range. Moreover, the catalyst system of the invention also provides the ability to control the polyolefin molecular weight during the polymerization reaction as a result of its improved responsiveness to hydrogen.

The ability of this catalyst system to control the MWD of the polymer product substantially eliminates the formation of low weight oligomers thereby facilitating the use of a polyolefin resin produced by the catalyst system as a blow molding resin. Moreover, the flexibility provided by this catalyst in allowing the tailoring of the breadth of the MWD over a wide range of molecular weights, permits the production of polymers having properties optimally suited for specific applications.

In view of the high activity of the catalyst system of this invention it is generally not necessary to deash the polymer product since it will generally contain lower amounts of catalyst residues than polymer product produced in the presence of conventional catalyst.

The catalyst disclosed in the invention may be used in combination with an alkyl aluminum cocatalyst under conditions characteristic of Ziegler polymerization.

The process to produce this novel catalyst comprises of the steps of first treating a hydrocarbon slurry of a catalyst support with a vanadium compound. Optionally, an organoaluminum compound may then be added to the mixture and allowed to react with the vanadium treated support material. Next, this reaction mixture may optionally be contacted with a halogenating agent. The resultant solid product is separated out, washed and dried. The dry product is reslurried with a hydrocarbon solvent and reacted with an organophosphorous compound. The organophosphorous compound is selected from the group consisting of phosphines, such as a trihydrocarbyl phosphine or a tri(N N'dihydrocarbylamino) phosphine; phosphite esters, such as a trihydrocarboxy phosphine; and phosphine oxides, such as trihydrcarboxy phosphine oxide, a hydrocarbyl dihydrocarboxy phosphine oxide, a trihydrocarbyl phosphine oxide, or a tri(N N'dihydrocarbylamino) phosphine oxide, or a mixture of two or more of such phosphines, phosphite esters and phosphine oxides. Preferably the hydrocarbyl radical and/or the hydrocarbyl portion of the hydrocarboxy radical of the organophosphorous compound is a $C_1$ to $C_{10}$ aliphatic or aromatic hydrocarbon radical free of aliphatic unsaturation. By judiciously selecting the quantity of the phosphorous compound, a supported vanadium catalyst producing a desired MWD may be produced. For a catalyst component produced with a given vanadium compound and a given organophosphorous compound as hereinafter disclosed, the MWD of a polyolefin produced with such catalyst component is controllable as a function of the phosphorous to vandadium metal mole ratio of the catalyst component. After reaction with the phosphorous compound, the supported catalyst material is removed, washed and dried.

The disclosed catalyst either by itself or in conjunction or with a cocatalyst may be employed in a gas phase process, single phase melt process, solvent process or slurry process for production of polyolefin resins. The catalyst may be usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The catalyst is particularly useful for the polymerization of ethylene and copolymerization of ethylene with other alpha-olefins in gas phase processes to produce LLDPE or HDPE.

DESCRIPTION OF THE PREFERRED EMBODIMENTS

The catalyst components of the present invention comprises the solid reaction product of (A) a vanadium compound in the presence of an inert support material (B) an optional organoaluminum compound, (C) an optional halogenating agent, and (D) an organophosphorous compound. The order of reaction is not critical. Hence, with respect to the above described components, the order of reaction of the components by addition to the inert support material may be (D), (A) then (B) or it may be (B), (D) then (A).

In the preferred embodiment of this invention, a slurry of the support material is treated with the vanadium compound. An organoaluminum compound is added to the slurry and is allowed to react to form a reaction product. This reaction product is then optionally contacted with a halogenating agent. Thereafter, the halogenated reaction product is removed, washed and dried before being reslurried with an inert hydrocarbon solvent. This reslurried mixture is then reacted with an organophosphorus compound to produce the final catalyst product which is separated out, washed and dried.

In another embodiment of the invention, the catalyst is prepared by reacting the vanadium compound with a hydrocarbon slurry of the dry catalyst support. The support is preferably a Group IIa IIIa, IVa, or IVb metal oxide, or a finely divided polyolefin or other suitable support catalyst material. This is followed by treatment with the organophosphorus compound. This resultant solid product is separated out, washed and dried.

In a further embodiment of this invention, there is provided a catalyst system consisting of the vanadium containing solid catalyst component and an alkylaluminum cocatalyst for the polymerization of alpha-olefins using the catalyst of this invention under conditions characteristic of Ziegler polymerization.

The preferred vanadium compounds (A) which may be usefully employed in the preparation of the vanadium containing catalyst component of this invention are well known in the art and may be represented by the formulas:

$$VCl_x(OR)_{3-x} \qquad (1)$$

where "x" is a number from 0 to 3 and R is a hydrocarbon radical;

$$VCl_y(OR)_{4-y} \qquad (2)$$

where "y" is a number from 3 to 4 and R is a hydrocarbon radical;

$$\overset{(O)_{3-z}}{\underset{V(AcAc)_z}{\|}} \qquad (3)$$

where "z" is a number from 2 to 3 and (AcAc) is acetyl acetonate group

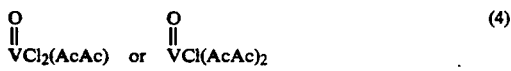  (4)

where (AcAc) is an acetyl acetonate group; and $VCl_3 \cdot nL$,  (5)

where "n" is a number from 2 to 3 and L is a Lewis base, such as tetrahydrofuran, which can form hydrocarbon-soluble complexes with $VCl_3$.

In formulas (1) and (2) above, R preferably represents a $C_1$ to $C_8$ aliphatic radical free of aliphatic unsaturation or an aromatic hydrocarbon radical such as a straight or branched alkyl, aryl, cycloalkyl, alkanyl, or aralkyl group, such as methyl, ethyl, propyl, isopropyl, butyl, n-butyl, i-butyl, t-butyl, pentyl, hexyl, cyclohexyl, octyl, benzyl, dimethyl, phenyl, naphthyl, etc.

Illustrative, but non-limiting examples of the vanadium compounds are vanadyl trichloride, vanadium tetrachloride, vanadium tetrabutoxy, vanadium trichloride, vanadyl acetylacetonate, vanadium acetylacetonate, vanadyl dichloroacetylacetonate, vanadyl chloradiacetylacetonate, vanadium trichloride complexed with tetrahydrofuran, vanadyl tribromide, vanadium tetrabromide, and the like.

The vanadium compound is preferably added to the reaction mixture in the form of a solution. The solvent can be any of the well-known inert hydrocarbon solvents such as hexane, heptane, benzene, toluene, and the like.

Typically, the support material can be any of the solid particulate porous supports such as talc, silica, zirconia, thoria, magnesia, and titania. Preferably the support material is a Group IIa, IIIa, IVa and IVb metal oxide in finely divided form. Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides used as a catalyst support generally contain acidic surface hydroxyl groups which will react with the vanadium compound. To avoid this, the inorganic oxide support is first dehydrated, either by thermal or chemical processes in order to remove water and reduce the concentration of the surface hydroxyl groups to a desired level.

The (B) organoaluminum compounds employed in this invention can be represented by the general formula $R'_m AlX_{3-m}$ wherein R' represents an alkyl group, cycloalkyl group or aryl group, X represents a halogen atom and "m" represents a suitable numeral equal to or greater than 1 and less than or equal to 3, or mixtures or complex compounds thereof. In particular, it is preferable to employ alkyl aluminum compounds wherein the alkyl groups have from 1 to 18 carbon atoms, preferably 1 to 9 carbon atoms. Illustrative but non-limiting examples of the organoaluminum compounds which may be suitably employed are the trialkylaluminums such as trimethylaluminum, triethylaluminum, tributylaluminum, triisobutylaluminum, tri-n-pentylaluminum, tri-n-octylaluminum, and the like. Illustrative examples of the dialkylaluminum halides are diethylaluminum, chloride, diethylaluminum fluoride, dimethylaluminum chloride, dibutylaluminum chloride, diethylaluminum bromide, diethylaluminum iodide and dibutylaluminum iodide. Examples of the monoalkylaluminum dihalides are methylaluminum dichloride, ethylaluminum dichloride, butylaluminum dichloride, isobutylaluminum dichloride, ethylaluminum dibromide, ethylaluminum diiodide, butylaluminum dibromide, and butylaluminum diiodide. Moreover, the sesquihalides can be suitable employed such as methylaluminum sesquichloride and ethylaluminum sesquichloride and the like.

The alkylaluminum may conveniently be added to the agitated slurry containing the inert particulate support in the form of a solution, with a dry hydrocarbon such as hexane, benzene, toluene, etc. Alternatively, the alkylaluminum may be added to the slurry in undiluted form.

In accordance with this invention, the optional halogenating agents are employed to obtain increased catalytic activity over similar catalyst systems absent the halogenating agent. The halogenating agents may be used to increase activity without detrimentally affecting the molecular weight distributions obtainable in accordance with this invention in which the content of oligomer is reduced. The halogenating agents which can be employed are chlorinating, brominating and iodinating agents. The halogenating agents are desirably strong halogenating agents, although weaker halogenating agents may be used with the result that generally broader molecular weight distributions are obtained. The halogenating agents can be liquid or gaseous under the reaction conditions.

Illustrative but non-limiting examples of the strong halogenating agents that can be usefully employed in accordance with this invention are the silicon halides and the hydrocarbyl halides.

The silicon halides can be represented by the formula $X_a SiR_b^s$ in which X is a halogen, $R^s$ is an alkyl, cycloalkyl or aryl radical containing 1 to 20 carbon atoms, "a"+"b"=4 and "a" is at least 1. illustrative examples of the silicon compounds are silicon tetrachloride, silicon tetrabromide, chlorosilanes such as, for example, trimethylchlorosilane, dimethyldichlorosilane, ethyltrichlorosilane, diethyldichlorosilane, dichlorodibutylsilane, trichlorobutylsilane, tribromobutylsilane, bromotrimethylsilane, and the like.

Other halogenating agents are the hydrocarbyl halides which include carbon tetrachloride, chloroform, 1,1,1-trichloroethane, dichloromethane, trichlorofluormethane and the like.

The preferred chlorinating agents are strong activating chlorinating agents, among which the most preferred are silicon tetrachloride, trichlorofluoromethane, trichloroethane and the like. Illustrative of weak activating chlorinating agents are the thionyl halides, such as $SOCl_2$.

The halogenating agent may be conveniently added to the reaction slurry consisting of the reaction product of the support material, the vanadium compound and the organoaluminum compound. The halogenating agent may be added as a pure compound or in the form of a solution with an inert solvent such as, for example, an aliphatic hydrocarbon solvent or an aromatic hydrocarbon solvent or it may be added as a gas.

The organophosphorous compounds (D) which can be usefully employed in the preparation of the vanadium containing catalyst component are the tri-substituted phosphines (Al) and phosphine oxides (Bl) and the phosphite esters (Cl), as represented by the formulas:

| | | |
|---|---|---|
| (A1-1) | PR″₃: | trihydrocarbyl phosphine; |
| (A1-2) | P(NR″₂)₃: | tris(N,N'dihydrocarbylamino) phosphine |
| (B1-1) | $\overset{O}{\underset{\|\|}{P}}(OR″)_3$: | trihydrocarboxy phosphine oxide [also named as a "trialkylphosphate"]; |
| (B1-2) | $\overset{O}{\underset{\|\|}{P}}R″(OR″)_2$: | hydrocarbyl dihydrocarboxy phosphine oxide [also named as an "alkyl dialkylphosphonate"]; |
| (B1-3) | $\overset{O}{\underset{\|\|}{P}}R″_2(OR″)$: | dihydrocarbyl hydrocarboxy phosphine oxide [also named as a "dialkyl alkylphosphonate"; |
| (B1-4) | $\overset{O}{\underset{\|\|}{P}}R″_3$: | trihydrocarbyl phosphine oxide; |
| (B1-5) | $\overset{O}{\underset{\|\|}{P}}(NR″_2)_3$: | tris(N,N'dihydrocarbyl amino) phosphine oxide [also named as an "alkylphosphoramide"]; |
| C1-1) | P(OR″)₃: | trihydrocarboxy phosphine [also named as a "trialkylphosphite"]. |

In the formulas above, R″ represents a hydrocarbyl radical, preferably a $C_1$ to $C_{10}$ aliphatic radical free of aliphatic unsaturation, or an aromatic hydrocarbon radical, and includes a straight or branched chain alkyl, aryl, cycloalkyl, alkanyl, aralkyl group such as methyl, ethyl, propyl, iospropyl, buty, n-butyl, i-butyl, t-butyl, pentyl, hexyl, cyclohexyl, octyl, benzyl, dimethyl phenyl, naphthyl, etc.

Illustrative, but non-limiting examples of the organophosphorous compounds are trimethylphosphine oxide, triethylphosphine oxide, tri-n-propylphosphine oxide, tri-n-butyphosphine oxide, tri-n-octylphosphine oxide, triphenylphosphine oxide, diethyl ethylphosphonate, diethyl methylphosphonate, dimethyl methylphosphonate, di-n-butyl butylphosphonate, trimethylphosphate, triethylphosphale, triphenylphosphate, tri-n-propylphosphate, tri-n-butyl-phosphate, trimethylphosphine, triethylphosphine, tri-n-butylphosphine, triphenylphosphine, hexamethylphosphoramide, hexapropylphosphoramide, hexa-n-butylphosphoramide, trimethylphosphite, triethylphosphite, tri-n-butyl-phosphite, tri-n-hexylphosphite, tri-n-octylphosphite, and the like.

The organophosphorous compound is preferably added to the reaction mixture in the form of a solution, but in the case where the organophosphorous compound is a liquid, it may be added in an undiluted form. The solvent can be any inert hydrocarbon solvents such as hexane, heptane, benzene, toluene, and the like.

The slurrying of the support material, as mentioned above, is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. The amount of solvent employed is not critical. Nevertheless, the amount employed should be sufficient to provide adequate heat transfer away from the catalyst components during reaction and to permit good mixing.

The amounts of catalytic ingredients employed in the preparation of the supported catalyst component can vary over a wide range. The vanadium compound is added to the slurry of inert support at a concentration of about 0.50 to about 2.0 millimoles V/g of dried support, preferably in the range of about 0.14 to about 1.4 millimoles V/g of dried support and especially in the range of about 0.2 to 0.8 milimoles V/g of dried support.

The concentration of aluminum alkyl deposited on the essentially dry, inert support can be in the range from about 0.1 to about 3 millimoles/g of support, however, greater or lesser amounts can be usefully employed. Preferably, the organoaluminum compound concentration is in the range of 0.1 to 2.0 millimoles/g of support and more preferably in the range of 0.4 to 1.3 millimoles/g of support.

The amount of optional halogenating agent employed should be such as to provide a halogen to aluminum mole ratio between about 1 and about 100 and preferably between 4 and 40.

The organophosphorous compound should be added to the reaction slurry at a concentration sufficient to give a P/V mole ratio of about 0.01 to 100, preferably in the range of about 0.1 to 10, and especially in the range of about 0.2 to 2.0.

Generally, the individual reaction steps may be conducted at temperatures in the range of about −50° C. to about 150° C. Preferred temperature ranges are from about −30° C. to about 60° C. with 20° C. to about 45° C. being most preferred.

The reaction time for the individual treatment steps can range from about 5 minutes to about 24 hours. Preferably the reaction time will be from about ½ hour to about 3 hours. During the reaction constant agitation is desirable.

In the preparation of the vanadium catalyst component, washing after the completion of any step may be effected.

The vanadium catalyst components prepared in accordance with this invention are usefully employed with cocatalysts well known in the art of the Ziegler catalysis for the polymerization of olefins. The cocatalysts preferably used are the alkyl aluminum compounds.

The catalyst system comprising the aluminumalkyl cocatalyst and the vanadium-containing solid catalyst component of this invention is preferably employed for the polymerization of ethylene. However, this catalyst system can also be used to polymerize other alpha-olefins having from 3 to 20 carbon atoms, ethylene copolymers with other alpha-olefins or diolefins, and ethylene copolymers with other alpha-olefins or diolefins.

The catalyst system may be usefully employed to produce polyethylene or copolymers of ethylene. The catalyst is especially useful for the preparation of high molecular weight LLDPE and HDPE. The olefins can be polymerized in the presence of the catalysts of this invention by any suitable known process such as, for example, suspension, solution and gas-phase processes.

The polymerization reaction employing catalytic amounts of the above-described supported catalyst can be carried out under conditions well known in the art of Ziegler polymerization, for example, in an inert diluent at a temperature in the range of 50° C. to 120° C. and a pressure of 1 and 40 atmospheres; in the gas phase at a temperature range of 70° C. to 100° C. at about 1 atmosphere to 50 atmospheres and upward. Illustrative of the gas-phase processes are those disclosed in U.S. Pat. No. 302,565 and U.S. Pat. No. 4,302,566, which patents are hereby incorporated in their entirety by reference. As indicated above, one advantageous property of the catalyst system of this invention is the reduced amount of gas phase reactor fouling.

Improved yields can be further obtained by employing polymerization promoters (activators) in combination which the catalyst system of this invention. The preferred activators are chlorocarbons. These activators are generally added to the polymerization reactor as a separate component. However, as an alternative, the activator can be adsorbed onto the surface of the catalyst component of this invention. The activator serves to significantly increase the productivity of the catalyst. Illustrative but non-limiting examples of the chlorocarbons are $CHCl_3$, $CFCl_3$, $CH_2Cl_2$, ethyltrichloroacetale, methyltrichloroacetate, hexachloropropylene, butylperchlorocrotonate, 1,3-dichloropropane, 1,2,3-trichloropropane, butylperchlorocrotonate, 1,3-dichloropropane, 1,2,3-trichloropropane, and 1,1,2-trichlorotrifluoroethane, etc. The activators may be gases or liquids at the conditions of polymerization.

The catalyst system of this invention is highly responsive to hydrogen allowing for the close control of molecular weight. Other well known molecular weight controlling agents, such as diethyl zinc, however, may be usefully employed.

The polymers prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in the light of the below examples and as such will fall within the general scope of the claims.

In the Examples following, the silica support was prepared by placing Davison Chemical Company D-948 silica gel in a vertical column and fluidizing with nitrogen. The column was heated slowly to between 400° and 800° C. and held at that temperature for 12 hours after which the silica was cooled to ambient temperature.

The polymers produced by the catalyst of this invention are characterized as having a "controlled" MWD. Generally, for different components produced with the same vanadium and phosphorous compounds, catalyst components having lower P/V metal ratios produce polyolefins of broader MWD than catalyst components having higher P/V metal ratios. While it is possible to measure MWD directly, a less expensive indirect method, using melt indices which measure the rate of polymer flow at a given shear stress, has been successfully employed to characterize polymer MWD. The melt index ratio (MIR) is the quotient of two measured indices, namely, the high load melt index (HLMI) divided by the melt index (MI). The MI of a polymer, which is also a measure of its molecular weight, is measured as described in ASTM D 1238 Condition E. Briefly, the method measures the rate of extrusion of a resin through an orifice of specified diameter and length at 190° C. and under a load of 2,160 grams (about 43.25 psi). The MI is inversely related to the polymer molecular weight because a higher molecular weight polymer will require greater shear forces to induce it to flow, i.e. it will flow less readily than a lower molecular weight polymer. Thus a higher molecular weight polymer will have a lower MI. The method of measuring the HLMI is the same as that for the MI except that ASTM D 1238 specifies Condition F which requires a pressure 10 times greater than that for the MI measurement. The MIR (HLMI/MI) is a measure of the polymer's shear response and larger MIR values indicate broader MWD's.

EXAMPLE 1 (Control)

Example 1 illustrates the performance of the prior art catalyst which does not incorporate the MWD regulating agents of the instant invention.

Preparation of Catalytic Component

Silica gel (800 g Davison silica dehydrated at 500° C.) was charged to a two gallon mixer and slurried in 3000 ml of degassed and dried iospentane. The temperature of the mixture was then increased to 41° C. To the stirred slurry was then charged, over a period of about 30 minutes, 0.77 mmoles of vanadium oxytrichloride per gram of silica as a 0.7M solution in iospentane. The reaction slurry was maintains at 41° C. for 1 hour with good stirring, after which time the mixture was allowed to settle and the supernatant was decanted. The resulting solid was washed once with 2500 ml of fresh isopentane for 15 minutes at 31° C., and the slurry was settled again, decanted, and reslurried in 2500 ml of iospentane, Over 30 minutes and with good agitation, 1.2 mmoles of isobutylaluminum dichloride per gram of silica were added as a 25 weight percent solution in heptane at a reaction temperature of 32° C. The mixture was allowed to react for a period of 1 hour after which time 4.87 mmoles of $SiCl_4$ per gram of silica were added. The addition was completed in 30 minutes and the mixture was allowed to react for 1 hour at 32° C. Finally, the stirring was discontinued, the slurry was allowed to settle, the supernatant was decanted, and the catalyst dried under flowing nitrogen.

Polymerization

To a 2.1 liter autoclave was charged 800 ml of purified hexane, 1.42 mmoles of triethylaluminum (TEAL) in 0.9 ml of heptane solution and 1.0 ml of trichlorofluoromethane activity promoter, along with 100 ml of 1-hexene. The temperature of the reactant was raised to 85° C., 31 mmoles of hydrogen were added and the reactor was pressured to 150 psig with ethylene. The polymerization was initiated by injection of 100 mg of the dry catalyst into the reactor. The pressure was maintained by constant flow of ethylene. Polymerization was maintained for 40 minutes at which time the reactor was vented to atmospheric pressure, cooled, and the polymer was isolated by evaporation of the hexane diluent. The polymerization results are set forth in Table 1.

EXAMPLES 2 THROUGH 5

Examples 2 through 5 illustrate the ability of the invention catalysts to provide a broad range of molecular weight distributions, as evidenced by variation in the MIR of the resins.

In Examples 2-5, 2.0 grams of the catalyst of Example 1 were slurried in hexane and tributylphosphine oxide was added as an 0.1M solution in hexane to give the indicated P/V mole ratio shown in Table 1. Enough hexane was added to the slurry to keep the volume of liquid constant at 30 ml. The slurry was stirred at room temperature for 2 hours, and was then allowed to settle, followed by decantation of the supernatant. The solid was washed once with 20 ml of fresh hexane and the wash was discarded. The catalyst was dried to a freely-flowing solid with nitrogen at room temperature. The catalysts were evaluated as in Example 1, except that 140 mg of catalyst were used and 1.9 mmoles of triethylaluminum were used as the cocatalyst. The polymerization results are also set forth in Table 1. The results show that the polymer MIR decreases as the level of tri-n-butylphosphine oxide in the catalyst is increased. The lower MIR values are indicative of narrower MWD's.

EXAMPLE 6 (Control)

A control catalyst, containing no organophosphorus compound was prepared in a manner analogous to that described in Example 1, except that the following active component loadings were used :0.42 mmoles of vanadium oxytrichloride per gram of silica; 0.66 mmoles of isobutylaluminum dichloride per gram of silica; 2.66 of $SiCl_4$ per gram of silica. The polymerization was carried out as in Example 1, except that 140 mg catalyst were used, along with 2.1 mmoles of TEAL cocatalyst. The results are set forth in Table 2.

EXAMPLES 7-8

Examples 7-8 illustrate the ability of diethyl ethylphosphonate to tailor the MWD of resins. Inventive catalysts were prepared as in Examples 2-5 above except that diethyl ethylphosphonate was used as the organophosphorus component and the catalyst of Example 6 was used as a starting material. Instead of 2.0 grams of catalyst per 30 ml liquid, 5.0 grams of catalyst were prepared. The P/V mole ratios were 0.1 and 0.5. The polymerizations were carried out as in Example 6, and the results are set forth in Table 2. The data shows that the inventive catalysts have the capability of producing variable MWD resins.

EXAMPLES 9-10

The following examples illustrate the ability of trimethylphosphate to control the resin MWD.

A catalyst was prepared in the manner described in Example 1 above and was then subjected to treatments with trimethylphosphate in a manner analogous to that described in Examples 2-5. The P/V mole ratios were 1.6 and 8.1. The treated catalysts were then run in ethylene homopolymerizations according to the following procedure: a 2.1 liter autoclave was charged with 1.5 ml of trichlorofluoromethane and 2.37 mmoles of TEAL cocatalyst. 800 ml of iosbutane were then charged to the reactor and the system was heated to 80° C. with good stirring; 50 mmoles of hydrogen were then charged by pressure drop from a stainless steel bomb that had been pressurized with hydrogen, and the reactor was pressured to 325 psig with ethylene. Polymerization was initiated by injection of 100 mg of the dry catalyst to the stirred reactor. The polymerization was allowed to proceed for 40 minutes, after which time the polymer was isolated by cooling the reactor and venting off the volatiles. The results of the polymerizations are set forth in Table 3. The data shows that as the level of trimethylphosphate increases the resin MIR is lowered, which indicates a narrowing of the MWD.

The slurry polymerizations of Example 10 produced the beneficial results of molecular weight distribution control but evidenced some reactor fouling, possibly from solubilization of some of the catalyst.

EXAMPLES 11-14

Examples 11-14 illustrate the of the inventive catalysts to provide also a broad range of MWD in ethylene homopolymerizations. The catalyst of Example 1 was treated as in Examples 2-5 with tri-n-butylphosphine oxide to give the varying P/V mole ratios as set forth in Table 4. The catalysts were evaluated in ethylene homopolymerizations as in Examples 9-10; the polymerization results, set forth in Table 4, show that as the level of tri-n-butylphosphine oxide is increased, the MIR is lowered.

The slurry polymerizations of Example 14 produced the beneficial results of molecular weight distribution control but evidenced some reactor fouling, possibly from solubilization of some of the catalyst.

EXAMPLE 15 (Control)

A catalyst with no organophosphorus component was prepared as follows: 15 grams of Davison 948 silica which had been dehydrated at 800° C. was charged to a 125 ml serum vial containing a magnetic stirrer. 60 ml of dry hexane were added to the vial to form a slurry, and with good stirring 15 ml of 0.7 M $VOCl_3$ in hexane were added. The mixture was stirred for an hour at room temperature, settled, washed with hexane twice, and then dried with flowing nitrogen to a freely-flowing solid. The catalyst was evaluated using the polymerization procedure of Examples 9 and 10. The results are set forth in Table 5.

EXAMPLES 16-18

Examples 16-18 show other embodiments of the invention, which demonstrate that the method of MWD control can be obtained with the instant invention for other combinations of catalyst components. Examples 16-18 also demonstrate another useful feature of the invention, namely, the reduction of the $C_{10}$-$C_{32}$ oligomer content as previously described. 1.0 grams of the catalyst of Example 15 were slurried in 5 ml of dry hexane and treated with 0.7 mmoles of organophosphorus compounds as set forth in Table 5. The organophosphorus compound was dissolved in 5 ml dry hexane and added to the catalyst slurry at room temperature, stirred for 2 hours at room temperature, and the mixture was then dried with flowing nitrogen to give the solid catalyst. The catalysts were evaluated in ethylene polymerizations as described in Examples 9-10. The results, shown in Table 5, indicate that the MWD of the resins is narrowed (lower MIR) for the catalysts which contain the organophosphorus components of the present invention.

The slurry polymerizations of Examples 16 and 17 produced the beneficial results of molecular weight distribution control but evidenced some reactor fouling, possibly from solubilization of some of the catalyst.

EXAMPLE 19 (Control)

A catalyst was prepared exactly as in Example 15, except that after the washes with hexane the catalyst was reslurried in hexane and treated with 4.2 ml of 1.58M TEAL in heptane with good stirring for 1 hour at room temperature. The mixture was then settled, the supernatant was decanted, and the catalyst was dried with flowing nitrogen. The catalyst was evaluated in the polymerization process of Examples 9 and 10. The results are shown in Table 6.

EXAMPLES 20-22

Examples 20-22 illustrate catalysts of the present invention which employ a trialkyl aluminum compound. Catalysts were prepared with the indicated organophosphorus compounds using the catalyst of Example 19 in a manner analogous to Examples 16-18. The polymerizations were carried out analogously and the results are shown in Table 6. The lower MIR values of the compounds containing the organophosphorus components are indicative of narrower MWD's.

EXAMPLE 23

A catalyst was prepared in a manner analogous to that described in Example 12 except that $SiCl_4$ was omitted from the catalyst preparation. The catalyst was evaluated in an ethylene polymerization as described in examples 11-14. The polymer yield was grams, the melt index was 3.31, and the MIR was 52.

EXAMPLES 24-25

Examples 24 and 25 illustrate the ability of hexamethylphosphoramide and tri-n-butylphosiphine to modify catalysts in a manner similar to tri-n-butylphosphine oxide. Catalysts were prepared with the indicated organophosphorous compound using the catalyst of Example 1 and the treatment procedure of Examples 2-5 to give the indicated P/V mole ratio as set forth in Table 7. Polymerizations were carried out as in Examples 11-14 and the results are shown in Table 7. At comparable P/V mole ratios, hexamethylphosphoramide and tri-n-butylphosphine give MIR values in the same range as tri-n-butylphosphine oxide, thus demonstrating their utility for modifying catalysts to give narrower MWD resins.

TABLE 1

EFFECT OF TRI-N-BUTYLPHOSPHINE OXIDE ON MOLECULAR WEIGHT DISTRIBUTION IN ETHYLENE/HEXENE COPOLYMERIZATIONS

| Example No. | P/V MOLE RATIO | YIELD (g) | MELT INDEX (dg/min) | MIR (HLMI/MI) |
|---|---|---|---|---|
| 1 | 0 | 95* | 0.02 | 200 |
| 2 | 0.39 | 210 | 0.59 | 95 |
| 3 | 0.98 | 272 | 0.88 | 80 |
| 4 | 1.29 | 215 | 4.60 | 49 |
| 5 | 1.96 | 168 | 16.4 | 26 |

*Example 1 used 100 mg of catalyst instead of 140 mg

TABLE 2

EFFECT OF DIETHYL ETHYLPHOSPHONATE ON MOLECULAR WEIGHT DISTRIBUTION IN ETHYLENE/HEXENE COPOLYMERIZATIONS

| Example No. | P/V MOLE RATIO | YIELD (g) | MELT INDEX (dg/min) | MIR (HLMI/MI) |
|---|---|---|---|---|
| 6 | 0 | 124 | 0.02 | 234 |
| 7 | 0.10 | 117 | 0.02 | 177 |
| 8 | 0.50 | 86 | 0.17 | 126 |

TABLE 3

EFFECT OF TRIMETHYLPHOSPHATE ON MOLECULAR WEIGHT DISTRIBUTION IN ETHYLENE POLYMERIZATIONS

| Example No. | P/V MOLE RATIO | YIELD (g) | MELT INDEX (dg/min) | MIR (HLMI/MI) |
|---|---|---|---|---|
| 9 | 1.6 | 72 | 0.15 | 126 |
| 10 | 8.1 | 29 | 0.90 | 79 |

TABLE 4

EFFECT OF TRI-N-BUTYLPHOSPHINE OXIDE ON MOLECULAR WEIGHT DISTRIBUTION IN ETHYLENE POLYMERIZATIONS

| Example No. | P/V MOLE RATIO | YIELD (g) | MELT INDEX (dg/min) | MIR (HLMI/MI) |
|---|---|---|---|---|
| 11 | 0.39 | 57 | 0.23 | 99 |
| 12 | 0.98 | 40 | 2.28 | 71 |
| 13 | 1.29 | 58 | 5.25 | 54 |
| 14 | 1.95 | 19 | 4.89 | 53 |

TABLE 5

POLYMERIZATION DATA FOR ORGANOPHOSPHORUS COMPOUND-MODIFIED CATALYSTS BASED ON $SiO_2/VOCl_3$

| EXAMPLE NO. | P/V MOLE RATIO | ORGANOPHOSPHORUS COMPOUND | POLYMER YIELD (g) | MELT INDEX (dg.min) | MIR | WT % $C_{10}$-$C_{32}$ OLIGOMERS |
|---|---|---|---|---|---|---|
| 15 | 0 | None | 34 | <0.01 | >153[1] | 0.185[2] |
| 16 | 1.0 | TBPO | 28 | 1.05 | 56 | 0.057 |
| 17 | 1.0 | DEEP | 40 | 0.42 | 62 | 0.103 |
| 18 | 1.0 | TPP | 20 | 0.28 | 74 | 0.103 |

TBPO = tri-n-butylphosphine oxide
DEEP = diethyl ethylphosphonate
TPP = triphenylphosphine

[1] Only the HLMI could be measured; it was 1.53 dg/min., and no flow was observed under Condition E (2.16 Kg.). Practically speaking, it is possible to measure values of MI (Condition E) down to 0.01 dg/min, and since no flow was observed the MI was less than 0.01 and the MIR was >153.

[2] Since the weight percent of oligomer material decreases markedly as the MI drops, the level of oligomer in this Example is fairly low; comparison of oligomer levels from the other Examples is considered a worst case comparison.

TABLE 6

POLYMERIZATION DATA FOR ORGANOPHOSPHORUS COMPOUND-MODIFIED CATALYSTS BASED ON SiO$_2$/VOCl$_3$/TEAL

| EXAMPLE NO. | P/V MOLE RATIO | ORGANOPHOSPHORUS COMPOUND | POLYMER YIELD (g) | MELT INDEX (dg/min) | MIR (HLMI/MI) |
|---|---|---|---|---|---|
| 19 | 0 | None | 23 | 0.02 | 245 |
| 20 | 1.0 | TBPO | 28 | 1.67 | 42 |
| 21 | 1.0 | DEEP | 39 | 1.48 | 66 |
| 22 | 1.0 | TPP | 29 | 0.22 | 89 |

TBPO = tri-n-butylphosphine oxide
DEEP = diethyl ethylphosphonate
TPP = triphenylphosphine

TABLE 7

| EXAMPLE NO. | P/V MOLE RATIO | ORGANOPHOSPHORUS COMPOUND | POLYMER YIELD (g) | MELT INDEX (dg/min) | MIR (HLMI/MI) |
|---|---|---|---|---|---|
| 24 | 1.6 | HMPA | 66 | 0.68 | 56 |
| 25 | 1.6 | TBP | 18 | 1.43 | 69 |

HMPA = hexamethylphosphoramide
TBP = tri-n-butylphosphine

The invention has been described with reference to its preferred embodiments. Those of ordinary skill in the art may appreciate changes and modifications which may be made to the invention which do not depart from the scope and spirit of the invention as described above or claimed hereafter.

What is claimed is:

1. A phosphorous containing supported vanadium catalyst component for polymerizing olefins, said catalyst component comprising a product made by reacting:

(i) a hydrocarbon slurry of an inert dry support material;

(ii) a vanadium compound of the general formulas:

$$VCl_x(OR)_{3-x}$$

where x is a number from 0 to 3 and R is a hydrocarbon radical;

$$VCl_y(OR)_{4-y}$$

where y is a number from 3 to 4 and R is a hydrocarbon radical;

$$V(AcAc)_z \quad (O)_{3-z}$$

where z is a number from 2 to 3 and (AcAc) is an acetyl acetonate group;

$$VCl_2(AcAc) \text{ or } VCl(AcAc)_2$$

where (AcAc) is an acetyl acetonate group, or $$VCl_3 \cdot nL$$

where n is a number from 2 to 3 and L is a Lewis base which can form one or more hydrocarbon-soluble complexes with VCl$_3$; and (iii) an organophosphorous compound of the general formulas:

$$PR''_3, \quad P(NR''_2)_3, \quad P(OR'')_3,$$
   $$\overset{O}{\underset{\|}{P}}(OR'')_3, \quad \overset{O}{\underset{\|}{P}}R''(OR'')_2, \quad \overset{O}{\underset{\|}{P}}R''_2(OR''),$$
   $$\overset{O}{\underset{\|}{P}}R''_3, \quad \text{or} \quad \overset{O}{\underset{\|}{P}}(NR''_2)_3;$$

wherein R'' is a hydrocarbon radical;
   wherein said phosphorous and said vanadium are present in said catalyst component in a mole ratio of phosphorous metal to vanadium metal in the range of from about 0.01 to about 100, the MWD of a polyolefin formed utilizing said catalyst component being determined by said mole ratio.

2. The supported catalyst component of claim 1 further comprising a product of reacting said slurry of inert dry support material and (iv) an organoaluminum compound of the wherein R'$_m$AlX$_{3-m}$ wherein R' represents an alkyl group, cyocloalkyl group or aryl group, X represents a halogen atom and "m" represents a number equal to or greater than 1 and less than or equal to 3.

3. The supported catalyst component of claim 1 further comprising a product of reacting said slurry of inert dry support material and (v) a halogenating agent selected from a group consisting of silicon halides and hydrocarbyl halides.

4. The supported catalyst component of claim 3, wherein the support material is silica, alumina, or silica-alumina.

5. The supported catalyst component of claim 4, wherein vanadium metal is present in the product of reaction in a concentration of from about 0.5 to about 2.0 millimoles of vanadium per gram of dried support.

6. The supported catalyst component of claim 2, wherein organoaluminum component is present in the product of reaction in a concentration of from about 0.2 to about 3.0 millimoles of aluminum per gram of dried support.

7. The supported catalyst component of claim 6, wherein phosphorous and vandium are present the product of reaction in a mole ratio of phosphorous metal to vanadium metal of from about 0.2 to about 2.0.

8. The supported catalyst component of claim 3, wherein said halogenating agent is reacted in an amount to provide in the product of reaction a mole ratio of halogen to aluminum of from about 1 to about 100.

9. A process for preparing a supported catalyst component for the polymerization of olefins, comprising the steps of:
(i) treating a hydrocarbon slurry of an inert, dry support material with
(a) a vanadium compound of the general formulas:

$$\overset{O}{\underset{\|}{V}}Cl_x(OR)_{3-x}$$

where x is a number from 0 to 3 and R is a hydrocarbon radical;

$$VCl_y(OR)_{4-y}$$

where y is a number from 3 to 4 and R is a hydrocarbon radical;

$$\overset{(O)_{3-z}}{\underset{\|}{V}}(AcAc)_z$$

where z is a number from 2 to 3 and (AcAc) is an acetyl acetonate group;

$$\overset{O}{\underset{\|}{V}}Cl_2(AcAc) \quad \text{or} \quad \overset{O}{\underset{\|}{V}}Cl(AcAc)_2$$

where (AcAc) is an acetyl acetonate group; or $$VCl_3 \cdot nL$$

where n is a number from 2 to 3 and L is a Lewis base which can form one or more hydrocarbon-soluble complexes with $VCl_3$, and;
(b) an organo-phosphorous compound of the general formulas:

$$PR''_3, \quad P(NR''_2)_3, \quad P(OR'')_3,$$

$$\overset{O}{\underset{\|}{P}}(OR'')_3, \quad \overset{O}{\underset{\|}{P}}R''(OR'')_2, \quad \overset{O}{\underset{\|}{P}}R''_2(OR''),$$

$$\overset{O}{\underset{\|}{P}}R''_3, \quad \text{or} \quad \overset{O}{\underset{\|}{P}}(NR''_2)_3,$$

in which R'' is a hydrocarbon radical;
(ii) separating said supported catalyst component from said slurried mixture; and
(iii) drying said supported catalyst component;
wherein the mole ratio of P:V is variable in the range of from about 0.01 to about 100, said mole ratio controlling the MWD of a polyolefin.

10. The process of claim 9 comprising a further step of adding to said hydrocarbon slurry of inert support material an organoaluminum compound selected from a group consisting of the formula $R'_mAlX_{3-m}$, wherein R' represents an alkyl group, cycloalkyl group or aryl group, X represents a halogen atom and "m" represents a number equal to or greater than 1 and less than or equal to 3; and allowing said organoaluminum compound to react with the support material to form a reaction product.

11. The process of claim 9 comprising a further step of contacting the reaction product with a halogenating agent and thereafter reacting a slurried mixture of the reaction product with said organo-phosphorous compound.

12. The process of claim 10 comprising the additional step of contacting the vanadium compound-treated slurry with a halogenating agent before adding the organoaluminum compound.

13. The process of claim 9 wherein the slurry of inert, dry support material consists of a fine, dehydrated support material, selected from the group consisting of silica, alumina, silica-alumina mixtures, talc, zirconia, thoria, finely divided polyolefin, and metal oxides from the Group IIa, IIIa, IVa, and IVb metals, slurried with a dry, inert hydrocarbon solvent.

14. The process of claim 9 wherein said vanadium compound is added to the slurry of inert support at a concentration from about 0.5 to about 2.0 millimoles vanadium per gram of dried support.

15. The process of claim 9 wherein said organophosphorus compound is added to yield a phosphor/vanadium mole ratio from about 0.01 to about 100.

16. The process of claim 9 wherein said organophosphorus compound is added to yield a phosphor/vanadium mole ratio from about 0.2 to about 2.0.

17. The process of claim 10 wherein said organoaluminum compound is deposited on the support in the concentration range from about 0.1 to about 3 millimoles per gram.

18. The process of claim 11 wherein said halogenating agent is deposited on the support in a concentration to provide a mole ratio of halogen to aluminum of from 4 to about 40.

19. A catalyst component for producing a polyolefin, prepared by a process comprising the steps of:
(a) reacting a hydrocarbon slurry of a dry support, said support selected from the group consisting of silica, alumina, and silica-alumina with a vanadium compound of the general formula:

$$\overset{O}{\underset{\|}{V}}Cl_x(OR)_{3-x}$$

where x is a number from 0 to 3 and R is a hydrocarbon radical said vanadium metal is present in a concentration in the range of from about 0.5 to about 2.0 millimoles of vanadium per gram of dried support;
(b) adding an organophosphorous compound to the product of step (a), said organophosphorous represented by one of the general formulas:

$$PR''_3, \quad P(NR''_2)_3, \quad P(OR'')_3$$

$$\overset{O}{\underset{\|}{P}}(OR'')_3, \quad \overset{O}{\underset{\|}{P}}R''(OR'')^2, \quad \overset{O}{\underset{\|}{P}}R''_2(OR'')$$

$$\overset{O}{\underset{\|}{P}}R''_3, \quad \text{or} \quad \overset{O}{\underset{\|}{P}}(NR''_2)_3$$

wherein R'' is a hydrocarbon radical, said organophosphorous compound is added in a mole ratio of phosphorus to vanadium metal in the range of from about 0.2 to about 2, said mole ratio varied to obtain a preselected molecular weight distribution of said polyolefin; said support selected from the group consisting of silica, alumina, and silica-alumina;

(c) adding the product of step (b) an organo aluminum compound of the formula $R^1_m AlX_{3-m}$, wherein $R'$ represents an alkyl group, cycloalkyl group or aryl group; X represents a halogen atom and m represents a number equal to or greater than 1 and less than or equal to 3, said organoaluminum compound is present in a concentration range of from about 0.2 to about 3.0 millimoles of said organoaluminum component per gram of said dry support; and (d) reacting the product of step (c) with a halogenating agent selected from the group consisting of silicon halides and hydrocarbyl halides, said halogenating agent being present in a mole ratio of halogen to aluminum in the range of from about 1 to about 100; said catalyst component being capable of producing a polyolefin having a predeterminable MWD resulting from a P:V mole ratio in the range of from about 0.01 to about 100.

* * * * *